United States Patent [19]

Clement

[11] 4,242,030
[45] Dec. 30, 1980

[54] SELF-LOADING CAR-TOP CARRIER FOR WHEELCHAIRS OR SIMILAR SIZED LOADS

[76] Inventor: Clyde H. Clement, 8439 N. 13th Pl., Phoenix, Ariz. 85020

[21] Appl. No.: 936,235

[22] Filed: Aug. 24, 1978

[51] Int. Cl.³ .............................................. B60R 9/00
[52] U.S. Cl. .................... 414/462; 224/310; 280/289 WC; 280/647; 294/82 R; 297/45; 297/DIG. 4; 414/542
[58] Field of Search ............... 414/462, 463, 464, 921, 414/541, 542, 544, 728, 742; 224/310, 42.07, 42.44, 326, 328; 254/175.5; 297/45, DIG. 4; 280/289 WC, 647, 242 WC; 294/82 R

[56] References Cited

U.S. PATENT DOCUMENTS

| | | | |
|---|---|---|---|
| 3,174,636 | 3/1965 | Dempster et al. | 414/648 X |
| 3,259,396 | 7/1966 | Zamorn | 280/242 WC X |
| 3,595,409 | 7/1971 | Bowman-Shaw | 414/544 |
| 3,696,953 | 10/1972 | Kim | 414/462 |
| 3,823,839 | 7/1974 | Petzing et al. | 414/462 |
| 3,856,342 | 12/1974 | Kelly | 294/67 R |
| 3,878,955 | 4/1975 | Udden | 224/310 X |
| 4,083,429 | 4/1978 | Abbott | 414/541 X |

FOREIGN PATENT DOCUMENTS

| | | | |
|---|---|---|---|
| 2343073 | 3/1975 | Fed. Rep. of Germany | 254/175.5 |
| 2013114 | 3/1970 | France | 254/175.5 |

*Primary Examiner*—Frank E. Werner
*Attorney, Agent, or Firm*—Drummond and Nelson

[57] ABSTRACT

A self-loading, weather protected carrier for raising or lowering an object to and from the top of a motor vehicle and for transporting the object on a motor vehicle. The carrier comprises a horizontally disposed base adapted to be mounted on the roof of a motor vehicle and having a transverse guide affixed thereto, a carriage extendably carried by transverse guide and movable at a vehicle top level between a load/unload position and a travel position, a generally L-shaped tilt frame, pivotally mounted on carriage and rotatable between a generally upright position for loading and unloading the object and a generally horizontal position for storing the object on motor vehicle, a linkage mechanism attached to tilt frame and responsive to the carriage being extended into the load/unload position to rotate tilt frame to upright loading position, and a hoist mounted on the tilt frame for raising and lowering the object. The linkage mechanism includes a thrust rod having one end pivotally attached to tilt frame, an upstanding tilt/thrust rail affixed to the base and having at least one inclined section, a drive arm having a first end pivotally fastened to the other end of the thrust rod and a second end pivotally connected to the carriage, and tracking mechanism attached to the drive arm and contacting the tilt/thrust rail, for traveling along rail and displacing the drive arm in response to the horizontal extension of the carriage into the load/unload position.

1 Claim, 9 Drawing Figures

SELF-LOADING CAR-TOP CARRIER FOR WHEELCHAIRS OR SIMILAR SIZED LOADS

BACKGROUND OF THE INVENTION

This invention relates to the field of automotive car top carriers.

In another respect, the invention relates to a car top carrier having an integral weather-protective cover to protect the load being transported.

In still another respect, the invention relates to a self-loading car top carrier capable of raising and lowering a load from and to ground level at operator command.

In yet another respect, the invention relates to a car top carrier particularly adapted for the transport of a foldable wheelchair utilized by either the driver or a passenger in the motor vehicle to which the car top carrier is affixed.

In another important respect, the invention relates to a self-loading, weather-protected, car top carrier having provision to both fold a foldable wheelchair and to move it from the ground to a transit position within said car top carrier atop the motor vehicle.

The prior art discloses various expedients for raising a load from ground level to car top height and storing it there for transit in a weather-protective cover. Many such carriers are particularly adapted for the transport of a foldable wheelchair such as used by many handicapped people today. In this respect, particular attention is called to U.S. Pat. Nos. 3,823,839; 3,878,955; 4,039,096 and 4,134,509. While all of the various devices disclosed in each of these references will allow a handicapped person to transport a wheelchair, it is believed that the teachings herein provide advantages not found in any one nor in all of the references cited. For example, the "839" reference requires the raising and lowering of a six-sided container, closed on four sides, into which the handicapped person must insert the wheelchair prior to having it raised to roof top level. Further, the use of a rack and pinion gear drive is there advocated. Such rack and pinion drives are quite expensive and require critical tolerances be maintained in order that they may work properly.

The "096" reference provides a channeled platform onto which the handicapped person must maneuver the folded wheelchair. A winch and pulley arrangement is used to raise and lower the platform. The use of a hydraulic cylinder is advocated to prevent the channeled platform . . . "from falling with great force against the side of the motor vehicle or against the sidewalk."

The "955" lowers the entire weather-protective enclosure from the top of the car to the sidewalk to encase the folded wheelchair. The wheelchair and the weather-protective enclosure are then transported back to the top of the car. One side of the enclosure remains open with the possible exception of providing a cloth cover, the use of which would be beyond the capabilities of most handicapped operators.

The "025" co-pending application reference makes use of an inclined plane which is somewhat wasteful of space and utilizes various spring-loading devices to raise or lock in place various elements of the device.

It would be highly desirable to provide a self-loading car top carrier which avoids the disadvantages apparent in the prior art. It would be particularly desirable to provide a self-loading car top carrier which simplifies the effort required of a handicapped person to load and unload his wheelchair.

Accordingly, a principal object of the invention is to provide a simplified self-loading weather-protected car top carrier system.

Another principal object of the invention is to provide a drive mechanism having the advantages of a rack and pinion drive but avoiding the cost generally associated with conventional rack and pinion manufacture and device tolerance maintenance.

Another principal object of the invention is to provide improved self-loading car top carrier system which avoids the use of spring loads or hydraulic damping devices. It is a still further and more specific object of the invention to provide overload protected drive systems not subject to damage when controlled by persons who may be handicapped and inept in the control of mechanical devices.

It is a still further and more specific object of the invention to provide a weather-protected, self-loading, car top carrier, which because of the simplicity of its design, will be inexpensive and yet reliable and which can be rapidly installed on a conventional motor vehicle by persons or ordinary mechanical skill, using simple readily available hand tools.

BRIEF DESCRIPTION OF THE DRAWINGS

These and other objects and advantages of the invention will be apparent to those skilled in the art from the following detailed description thereof, taken in conjunction with the drawings, in which:

FIG. 3A illustrates the carrier in the travel position.

FIG. 3D illustrates the carrier in the load position with the carriage fully extended, the tilt frame erect and the hoist in use.

FIGS. 3B and 3C illustrate progressive positions assumed by the carriage and tilt frame assembly as the carriage is moved from the travel to the load position.

SUMMARY OF THE INVENTION

Briefly, in accordance with the invention, I provide an improved car top carrier capable of operation by a handicapped person such that the handicapped person's wheelchair is folded, hoisted to the car top carrier and placed in a stored position ready for travel. The improvement, in accordance with the invention, comprises, in operative combination, use of overload protected, reversible drive motors, an inexpensive pseudo rack and pinion drive, and a novel tilt/thrust drive which positions the hoist to accept a load to be raised and stored within the car top carrier.

In accordance with a presently preferred embodiment of the invention, the car top carrier includes a base which is mounted atop a motor vehicle. An extendible carriage traverses rails which are affixed to said base. The carriage assembly includes means to extend it to the load position and to retract it to the travel position, a hoist for raising a load from the ground while the carriage is in its extended, load position; a tilt frame which positions the hoist above the load to be raised to the car top carrier and which reclines to a horizontal position when carriage assembly is retracted so as to store said load for travel. A unique feature of the hoist assembly is the hoist engagement bar which operates cooperatively with most commercial, foldable wheelchairs such that when the hoist engagement bar is brought into engagement with the said wheelchair and the hoist actuated, the wheelchair is automatically folded without further effort on the part of the operator. The tilt frame has a pivot arm which is driven by a thrust rod connected to a thrust drive arm which, in turn, is provided with a thrust drive roller assembly. The thrust drive roller assembly traverses a tilt/thrust rail as the carriage assembly is extended. The tilt/thrust rail is a generally horizontal bar having an inclined section connecting two segments of said bar which are displaced at different heights above the base of the car top carrier. As the carriage is extended from the travel to the load position, the thrust drive roller assembly traverses the tilt/thrust rail. When it encounters the inclined section of the tilt/thrust rail, the thrust drive roller assembly causes the thrust drive arm to pivot, transmitting a force along the length of the thrust rod to the pivot arm of the tilt frame thereby causing the tilt frame to tilt up to its loading position. In retracting the carriage assembly, the reverse action takes place and the tilt frame reclines to its traveling position.

DESCRIPTION OF PREFERRED EMBODIMENTS

Figure 1:
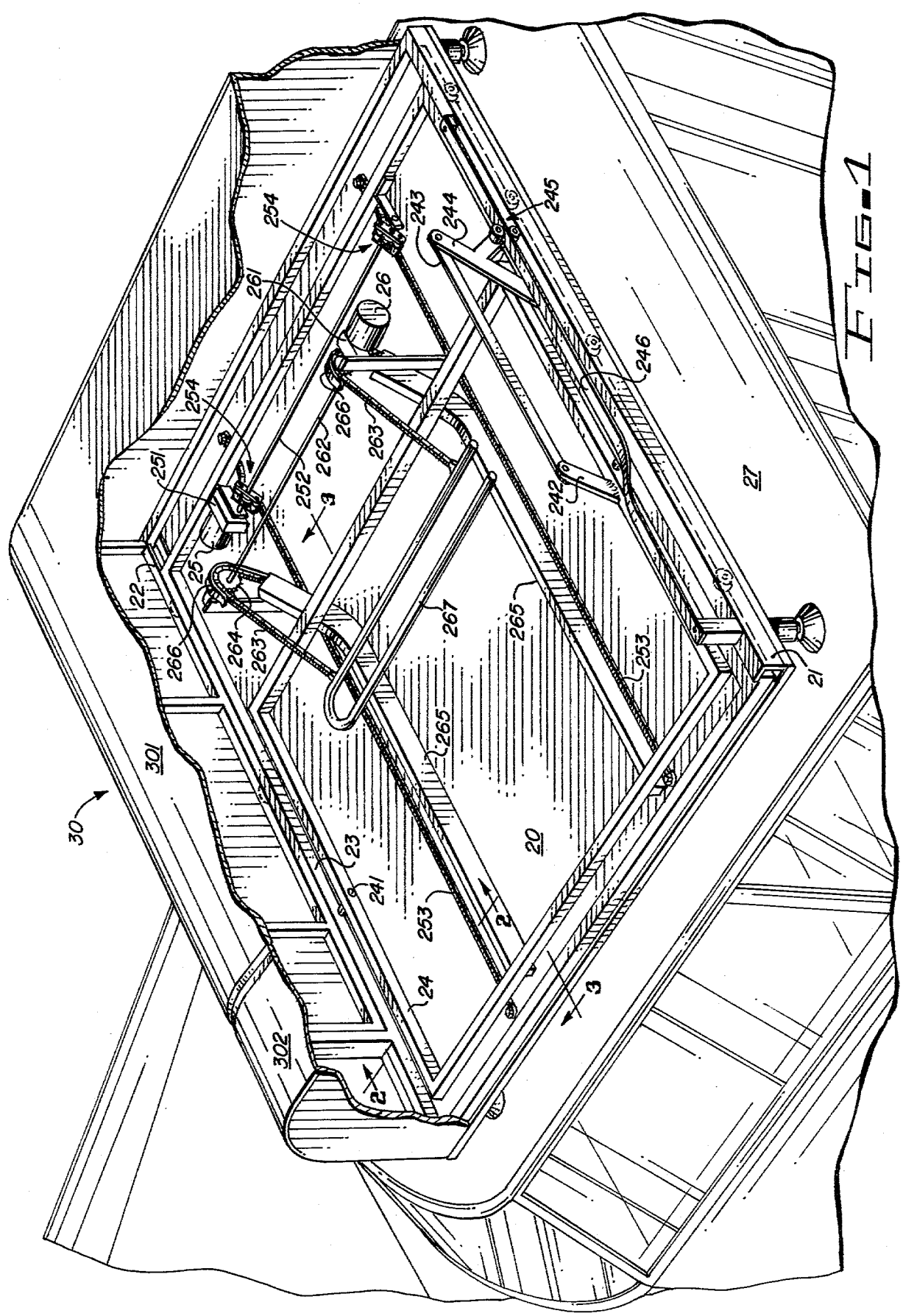
FIG. 1 is a perspective view of the self-loading car top carrier with the weather-protective cover partially removed. Details of the carriage assembly, tilt frame, hoist, and drive mechanisms are readily apparent in this figure.
Figure 2:
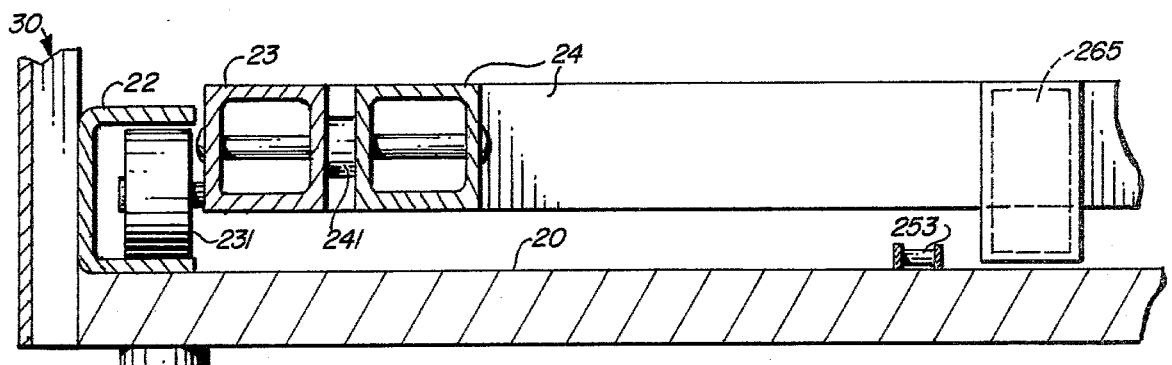
FIG. 2 is a cross-sectional view showing in detail the arrangement by which the tilt frame is pivoted about the carriage assembly as well as the roller guides which ease the passage of the carriage along the rails of the car top carrier.
Figure 5A:
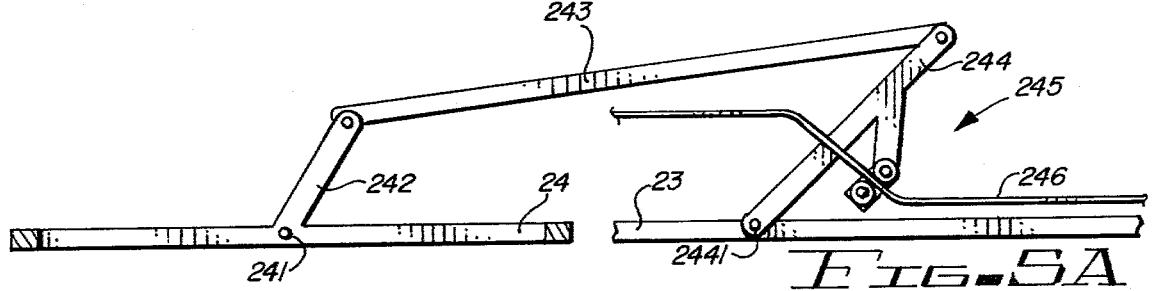
FIGS. 5A–B illustrate the mechanism whereby the tilt frame is caused to rotate as the carriage assembly moves from the travel to the load position.

Turning now to the drawings, in which a presently preferred embodiment of the invention is shown for purposes of illustration, FIG. 1 depicts the essential elements of the car top carrier. Base 20 is mounted atop a motor vehicle and is provided with rails 21 and 22 which are traversed by roller guides 231 as carriage assembly 23 is extended from the position it is shown in in FIG. 1. A tilting frame 24 is pivotally fastened to the carriage assembly as indicated at 241 in the figures, like reference characters representing identical elements in the various illustrations. As carriage assembly 23 is extended from the position shown in FIG. 1, the tilt frame is driven by a thrust applied to pivot arm 242 by thrust rod 243. Thrust rod 243 is activated in response to the movement of thrust drive arm 244 initiated by thrust drive roller assembly 245 as it traverses the incline section of tilt/thrust rail 246. The tilting response of tilt frame 24 engendered by thrust drive roller assembly 245 as it traverses the incline section of rail 246 is clearly illustrated in FIGS. 5A and 5B. FIG. 5A illustrates the thrust drive assembly 245 just as it begins to enter the lower part of the incline section of tilt/thrust rail 246. At this time, tilt frame 24 is in its horizontal, travel position.

Figure 5B:
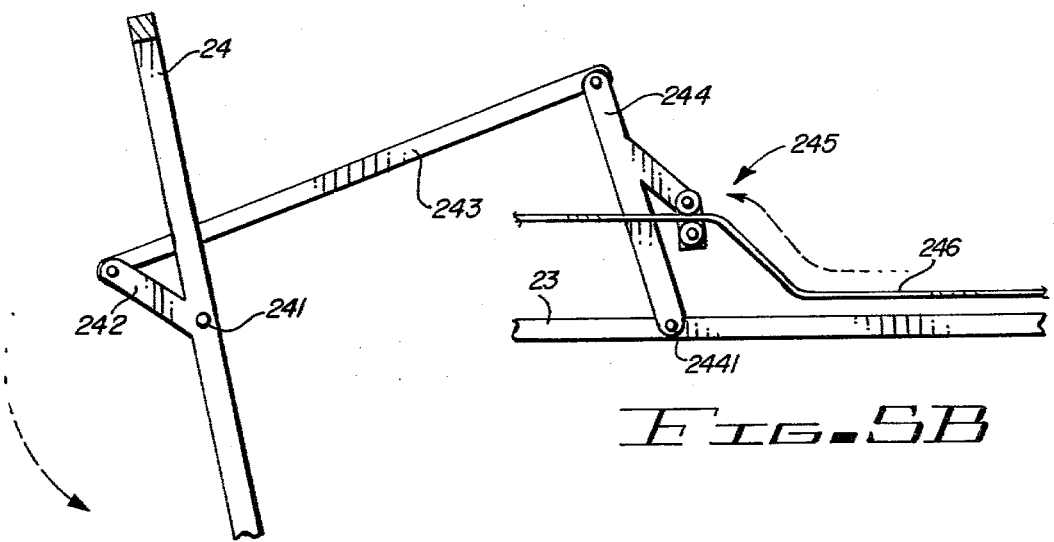

As FIG. 5B depicts, the displacement of thrust drive roller assembly 245 to the top of the incline of tilt/thrust rail 246 results in the pivotal displacement of thrust drive arm 244 about pivot 2441. This pivotal motion of thrust drive arm 244 causes displacement of thrust rod 243, causing pivot arm 242 and tilt frame 24 to which it is attached to pivot about pivot 241. In the position shown in FIG. 5B, carriage assembly is essentially ready to accept a load or to lower a load already in place within the carrier.

The driving force to extend or retract the carriage assembly is provided by carriage drive motor 25. Carriage drive motor 25 is an overload protected motor similar to those utilized to raise and lower the windows in today's automobiles. These motors, when driven to an overload position, will stall, at which point the electrical drive will be removed from them automatically.

Carriage drive motor 25 is coupled to carriage drive shaft 252 via gear reduction box 251. In lieu of an expensive, high tolerance rack and pinion drive, the invention utilizes a unique bogie-restrained pinion/chain link rack drive. The "rack" consists of a length of flexible link chain 253 having each of its ends affixed to base 20 as shown in FIG. 1. A sprocket gear driven by carriage drive shaft 252 engages the flexible link rack, such engagement being maintained by a bogie assembly which places a bogie wheel at diametrically opposite extremes of said gear. Said gear and bogie assembly is hereinafter referred to as a bogie-restrained pinion and is given the reference 254. The bogie assembly itself is mounted on carriage drive shaft 252 and is free to rotate about said shaft. This freedom to rotate about the carriage drive shaft allows the bogie assembly to assume that position which permits the pinion gear to advance along the flexible chain link rack with the least load on carriage drive motor 25. Further the fact that the bogie assembly maintains the pinion and flexible link chain rack in constant engagement eliminates the need for precision tolerances as are typically associated with conventional rack and pinion drives. In addition, it is unnecessary to place the flexible chain link rack 253 in tension in order to maintain its engagement with the pinion gear. This, in itself, eases the burden on carriage drive motor 25. The flexible link chain rack/bogie-restrained pinion drive is disclosed in greater detail in the co-pending application by the inventor herein entitled "Self-Loading Car Top Carrier" filed coincident with the present application.

Two such flexible link chain/bogie-restrained pinion drives are indicated in FIG. 1 both bearing the same reference numbers 253/254. Since carriage drive motor 25 and carriage drive shaft 252 are mechanically connected to carriage assembly 23, operation of carriage drive motor 25 will cause the bogie-restrained pinions 254 to advance along the length of flexible link chain rack 253 and thus, in the illustration depicted in FIG. 1, cause carriage assembly 23 to extend itself from the position shown to that of the load position. Reversing the electrical drive to drive motor 25 will cause the carriage assembly to retract to the travel position, that is, that shown in FIG. 1.

Hoist means for raising and lowering a load to the car top carrier are attached to tilt frame 24. The hoist is comprised of drive motor 26, being an overload protected motor similar to that of carriage drive motor 25. Hoist motor 26 is coupled to drive shaft 262 through gear reduction box 261. The hoist mechanism itself is comprised of flexible link chain 263 and drive gear 264 fastened to hoist drive shaft 262. Excess chain accumulated as the load is lifted into the carrier is fed to accumulator receptacle 265 where it is stored while the hoist is in the raised position. In the embodiment depicted in FIG. 1, two hoist chains 263 are illustrated. Attached to hoist chains 263 is hoist engagement bar 267 which is configured such that a portion of it may be slipped beneath the seat of a folding wheelchair, preparatory to hoisting the chair to the car top carrier, so that when the hoist is operated the effect is to raise the seat of the folding wheelchair, causing the wheelchair to automatically fold for storage in the car top carrier. This automatic, self-folding of the wheelchair for storage in the carrier is a feature which will be readily appreciated by a handicapped person.

To maintain the working engagement of gear 264 with chain 263, a chain guide 266 is provided. Chain guide 266 is so constructed that chain 263 is guided onto and into engagement with gear 264 and then guided therefrom to accumulator 265 for storage.

The entire carrier is protected from the elements by a covering shell 30. This weather-protective cover 30 is comprised of two segments, 301 being the larger segment and being fixedly mounted in place on the car top carrier. The smaller section, 302, is fastened to carriage assembly 23 and moves with the same as the carriage is extended. The juncture of segments 301 and 302 is provided with gaskets 3011 and 3021 to maintain the weather-tight integrity of the protective cover 30 when the carriage 23 has been retracted to the travel position.

To operate the car top carrier, a handicapped person confined to a wheelchair but capable of driving a car will open the car door and operate the necessary control to energize carriage drive motor 25. This will cause carriage 23 to extend and tilt frame 24 to tilt in such manner as to raise the hoist to its loading position. The carriage will stop automatically when it reaches the limits of its extension. This will cause carriage drive motor 25 to stall out and, by reason of its construction, its electrical drive power will be removed. Typically these motors are protected by a bi-metallic circuit breaker which, when the motor stalls, opens the power line to the motor. Having extended the carriage and hoist to its loading position, the handicapped operator activates the control for the hoist drive motor, lowering the hoist engagement bar into a position where he may reach it and engage it beneath the seat of the folding wheelchair. The hoist motor drive control is then operated so as to reverse the drive motor's direction, causing the hoist to raise the hoist engagement bar 267. This causes the seat to fold upward and to draw its edges, where attached to the wheelchair, to draw inward. The action is that which is required to fold the folding wheelchair. As the hoist continues to rise, the wheelchair becomes fully folded and is drawn upward until the top extension of hoist engagement bar 267 is drawn against chain guides 266, causing hoist drive motor to stall. The operator then operates the carriage drive motor control, driving it in a direction to retract carriage 23. The action of retracting the carriage causes tilt frame 24 to recline to its horizontal traveling position, bringing the folding wheelchair into contact therewith for storage while in transit.

Figure 3A:
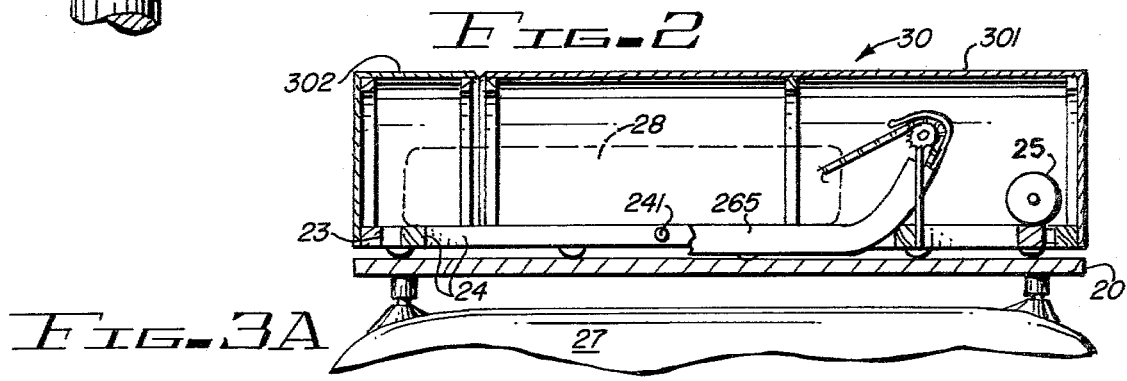
FIGS 3A–D is a cross-sectional view of the car top carrier taken from about the center line looking to the left of the carrier as it is illustrated in FIG. 1.
Figure 3B:
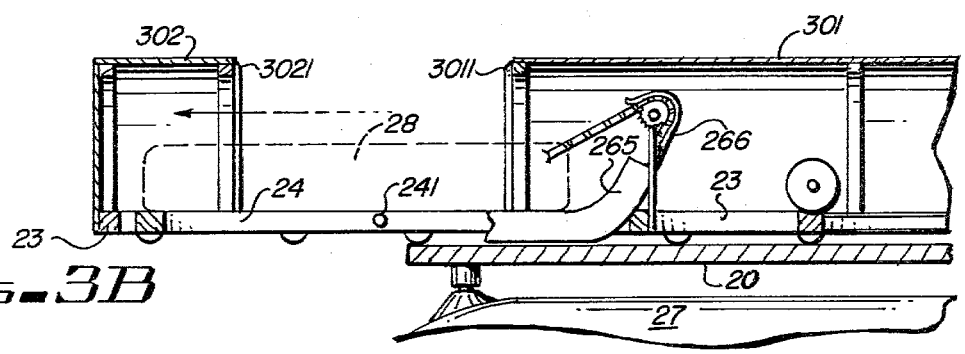
Figure 3C:
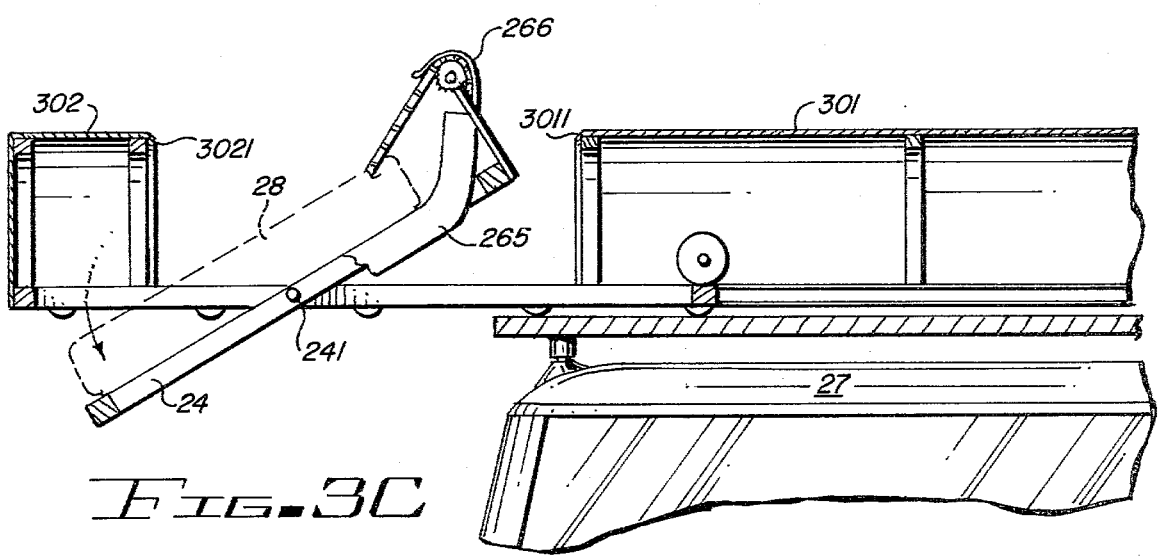
Figure 3D:
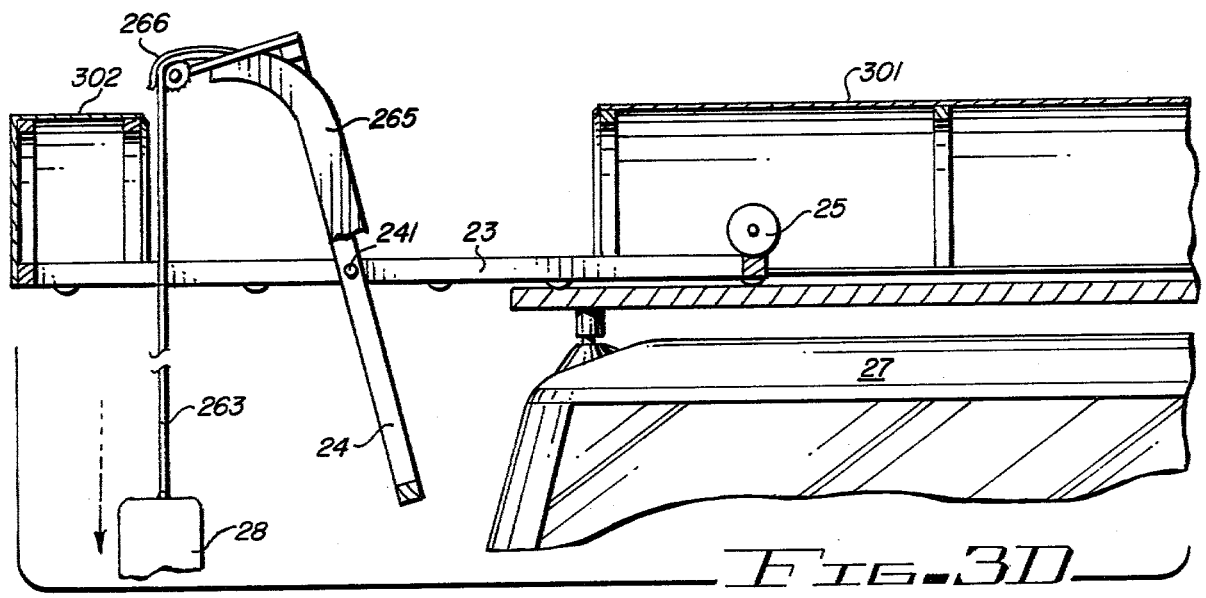
Figure 4:
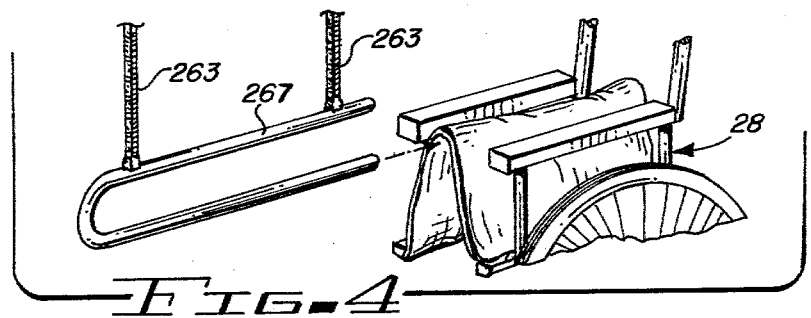
FIG. 4 illustrates the hoist engagement bar and the manner in which it is utilized to both fold a wheelchair for storage and then raise it to the car top carrier for storage and transportation.

The operation may be more fully understood by an examination of FIGS. 3A-D and 4. Reference may also be made to FIGS. 5A-B which have already been discussed in some detail. FIGS. 3-4 depict the sequence of events which occur in order to unload the car top carrier. In FIG. 3A, the carrier is shown mounted to car top 27. The envelope of the folded wheelchair or other load is illustrated by phantom outline 28. The carrier is shown in its travel position, the weather-protective cover 30 being closed with each of its segments 301 and 302 being in contact. In FIG. 3B, the carriage drive motor has been energized, causing the separation of cover segments 301 and 302 and extending carriage 23 out to the side of the car. Although pivot 241 has cleared carrier base 20, it would be inopportune to cause tilt frame 24 to rotate about pivot 241 at this time since to do so would cause chain guard 266 to strike the inner surface of case segment 301. To prevent the revolution of tilt frame 24 about pivot 241, rod thrust drive arm 244 is restrained by maintaining thrust drive roller assembly 245 to the lower horizontal segment of tilt/thrust rail 246. (Reference FIG. 5A).

In FIG. 3C, the illustration depicts the carriage assembly as having been extended sufficiently to initiate the revolution of tilt frame 24 about pivot 241. This revolution of tilt frame 24 is caused by thrust drive roller assembly 245 traversing the inclined section of tilt/thrust rail 246. In FIG. 3D, carriage assembly 23 has been extended to its limit, stalling the carriage drive motor 25, and breaking the drive circuit power thereto. As also indicated, tilt frame 24 has completed its revolution about pivot 241 to place it in the load position. The load position of tilt frame 24 is established when thrust drive roller assembly 245 reaches the top of the incline of tilt thrust rail 246 and is maintained in the load position while the thrust drive roller assembly is positioned along the upper horizontal segment of tilt/thrust rail 246. As shown further in FIG. 3, the hoist motor has been energized so as to lower the wheelchair 28.

In FIG. 4, partial view of wheelchair 28 is shown, it being assumed that it has been completely lowered to the ground. At this point, hoist engagement bar 267 is slipped from beneath the folded seat and hoist motor 26 energized to raise the lift bar into its travel position, following which carriage drive motor 25 is energized so as to retract carriage 23 placing tilt frame back in the storage position and returning the weather-tight integrity to case 30. The handicapped operator then unfolds the folding wheelchair by means of a combined shaking and tilting motion and transfers himself from the automobile driver's seat into the wheelchair.

The term "gear" or "sprocket gear" used herein is not to be considered a limitation on the element employed for the purpose described. Chain ears, sprocket wheels or any similar suitable device may be utilized without departing from the spirit of the invention. So too, although the tilt/thrust drive mechanism has been described in an embodiment utilizing a thrust drive roller assembly, this is not to be taken to imply that other low friction bearing surfaces other than roller bearings may not be employed to the same end.

Having described my invention in such a clear and concise manner as to enable those skilled in the art to understand and practice it, and having described the presently preferred embodiments thereof, I claim:

I claim:

1. A self-loading, weather protected carrier for raising or lowering an object to and from the top of a motor vehicle and for transporting said object on said motor vehicle, said carrier comprising (a) a horizontally disposed base adapted to be mounted on the roof of a motor vehicle and having transverse guide means affixed thereto, (b) a carriage extendably carried by said transverse guide means and movable at a vehicle top level between a load/unload position and a travel position, (c) a generally L-shaped tilt frame, pivotally mounted on said carriage and rotatable between a generally upright position for loading and unloading said object and a generally horizontal position for storing said object on said motor vehicle,
(d) linkage means, attached to said tilt frame and responsive to said carriage being extended into said load/unload position to rotate said tilt frame to said upright loading position, said linkage means including
  (i) a thrust rod having one end pivotally attached to said tilt frame,
  (ii) an upstanding tilt/thrust rail affixed to said base and having at least one inclined section,
  (iii) a drive arm having a first end pivotally fastened to the other end of said thrust rod and a second end pivotally connected to said carriage, and
  (iv) means, attached to said drive arm and contacting said tilt/thrust rail, for traveling along said rail and displacing said drive arm in response to the horizontal extension of said carriage into said load/unload position,
(e) attachment means for engaging said object,
(f) hoist means mounted on said tilt frame for
  (i) suspending said engaging means from said carriage assembly so that said engaging means may receive at least a portion of said object, and
  (ii) raising and lowering said engaging means and said object, and
(g) means for extending said carriage.

* * * * *